United States Patent [19]
Iizuka

[11] Patent Number: 5,225,939
[45] Date of Patent: Jul. 6, 1993

[54] LENS BARREL WITH INTEGRALLY FORMED ZOOM OPERATION TUBE AND CAM TUBE

[75] Inventor: Toshimi Iizuka, Kanagawa, Japan

[73] Assignee: Canon Kabushiki Kaisha, Tokyo, Japan

[21] Appl. No.: 733,425

[22] Filed: Jul. 22, 1991

[30] Foreign Application Priority Data

Jul. 25, 1990 [JP]  Japan ................................. 2-198857

[51] Int. Cl.⁵ ............................................. G02B 15/00
[52] U.S. Cl. .................................. 359/811; 359/699; 359/701; 359/819; 359/813
[58] Field of Search .................. 359/699, 700–706, 359/823, 811, 819, 813

[56] References Cited

U.S. PATENT DOCUMENTS

| | | | |
|---|---|---|---|
| 4,636,042 | 1/1987 | Komine et al. | 359/700 |
| 4,950,060 | 8/1990 | Nagasaka | 359/701 |
| 4,993,815 | 2/1991 | Yamazaki et al. | 359/699 |
| 5,035,493 | 7/1991 | Tanaka | 359/701 |

*Primary Examiner*—David P. Porta
*Assistant Examiner*—Kim-Kwok Chu
*Attorney, Agent, or Firm*—Robin, Blecker, Daley & Driscoll

[57] ABSTRACT

A lens barrel comprises a lens for zooming and a moving mechanism for moving the lens in the direction of an optical axis. The moving mechanism includes a zoom operation tube for performing a zooming operation and a cam tube disposed inside the zoom operation tube and having a cam part. The zoom operation tube and the cam tube are integrally formed.

20 Claims, 2 Drawing Sheets

LENS BARREL WITH INTEGRALLY FORMED ZOOM OPERATION TUBE AND CAM TUBE

BACKGROUND OF THE INVENTION

1. Field of the Invention

This invention relates to a lens barrel having a cam member.

2. Description of the Related Art

Heretofore, the zoom lens barrel of the kind called a short zoom lens has been composed of a mount, a fixed tube, a cam tube, a zoom operation ring, etc.

However, the conventional zoom lens barrel of the above-stated kind has necessitated the use of a guide tube which is provided with a guide groove for zoom-moving a lens carrying frame in conjunction with the cam tube. Further, the cam tube and the zoom operation ring have been arranged separately from each other. The conventional arrangement of these parts leaves much room for reduction in manufacturing cost.

Further, it has been necessary for the conventional lens barrel to have a mechanism for adjustment of a flange focal distance (a back focal distance). For example, it is generally practiced to measure the degree of error of the flange focal distance and to insert in between the mount and the fixed tube a washer having a thickness corresponding to the measured degree of error. In accordance with this method, however, it is difficult to continuously vary the degree of adjustment. Besides, the method necessitates the washer to be kept in stock in many different kinds. This has presented an inconvenience with respect to management of parts.

SUMMARY OF THE INVENTION

It is one aspect of this invention to provide a lens barrel which is arranged to obviate the necessity of the conventionally required guide tube for reduction in the number of necessary parts. To attain this object, a lens carrying member is arranged to be movable only in the direction of the optical axis by means of a guide member provided in a fixed part including a mount and to be moved in the direction of the optical axis by a cam member which has a cam part formed on the inner circumference surface thereof.

The above and other aspects and features of the invention will become apparent from the following detailed description of an embodiment thereof taken in connection with the accompanying drawings.

DETAILED DESCRIPTION OF THE PREFERRED EMBODIMENT

Figure 1:
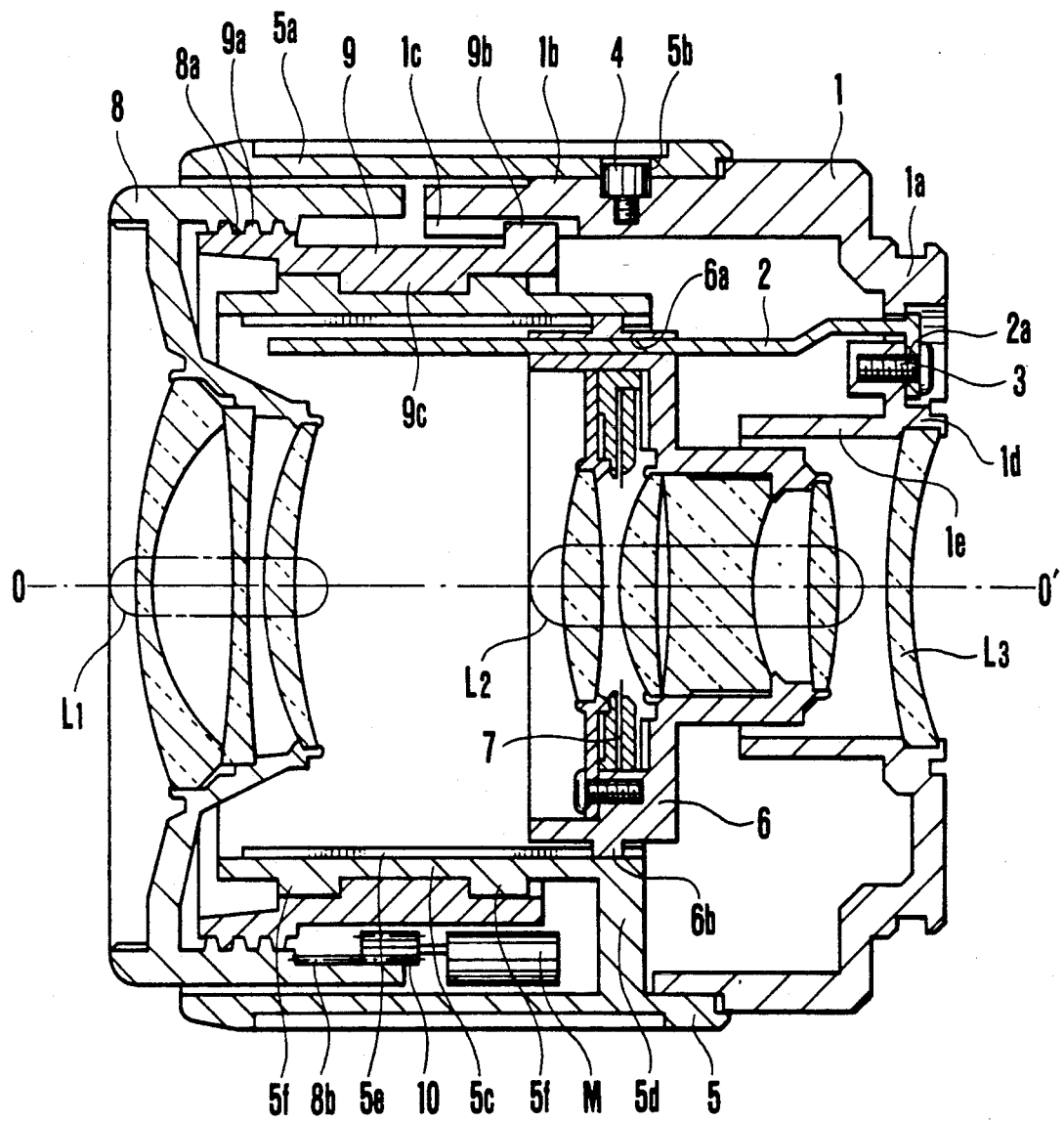
FIG. 1 is a sectional view showing an interchangeable lens which is arranged according to this invention as an embodiment thereof.
Figure 2:
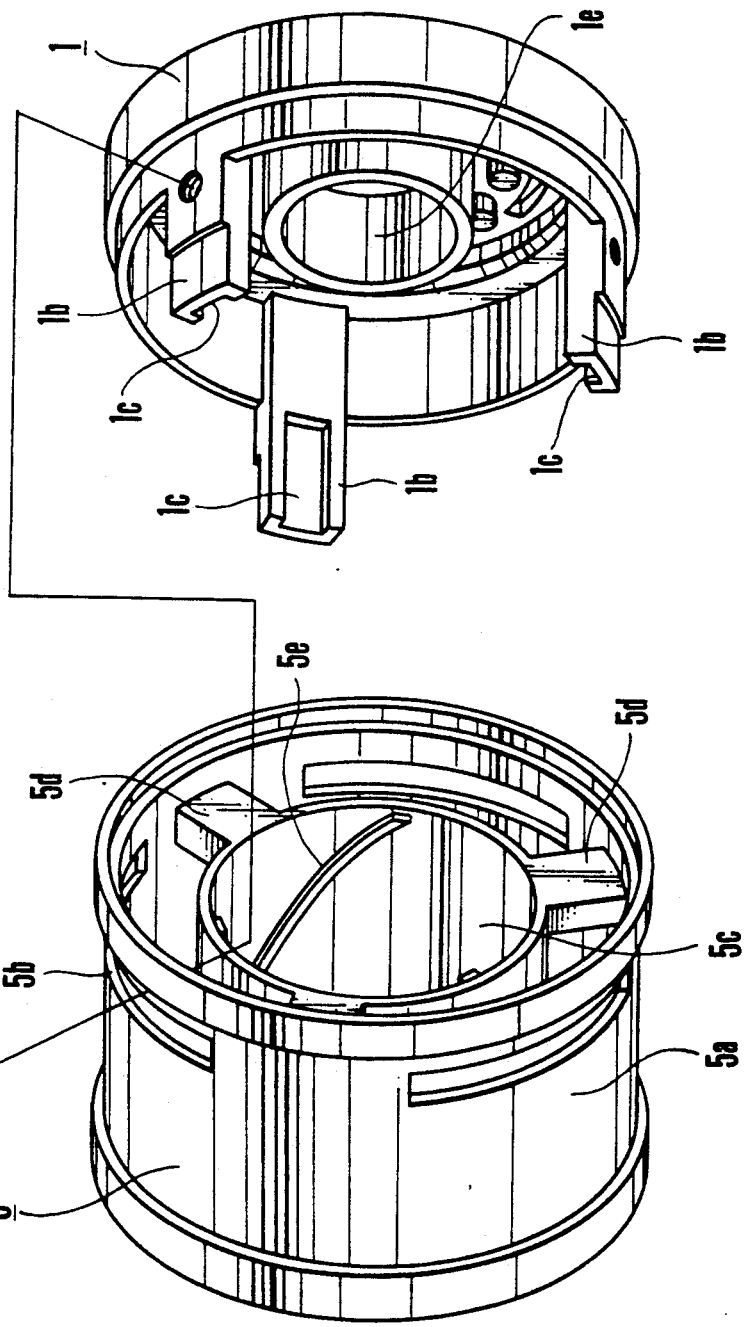
FIG. 2 is an oblique view showing a fixed part and a zoom ring shown in FIG. 1.

FIGS. 1 and 2 show an embodiment of this invention, FIG. 1 being a sectional view best showing the feature of the invention and FIG. 2 being an exploded oblique view showing the essential parts of FIG. 1. Referring to these figures, a fixed part 1 is formed integrally with a bayonet mount which is arranged to be detachably attachable to a camera body. The fixed part 1 has parts $1a$, $1b$, $1c$, $1d$ and $1e$ which are integrally formed. These parts include a bayonet mount part $1a$; three posts $1b$ extending in the direction of the optical axis 0—0' of the fixed part 1; guide grooves $1c$ each formed on the inner circumference surface of each of the posts $1b$ to extend in the direction of the optical axis; a lens carrying part $1d$ which is provided in a smaller diameter part of the fixed part 1; and a baffle $1e$ which extends in the direction of the optical axis from the lens carrying part $1d$. A key 2 is carried by the fixed part 1 and extends in the direction of the optical axis. A screw 3 is used for securing the key 2 to the fixed part 1. A pin 4 is erected on the outer circumference surface of each of the posts $1b$. A zoom ring 5 is rotatably carried by the fixed part 1 and is arranged to be rotated by a given angle around the optical axis 0—0'. The zoom ring 5 has parts $5a$, $5b$, $5c$, $5d$, $5e$ and $5f$ which are integrally formed. These parts include a zoom operation part $5a$ which is an external portion of the zoom ring 5 and is provided for a zooming operation; circumferential slots $5b$ each of which is formed to extend in the circumferential direction of the zoom operation part $5a$ by a given angular degree; a cylindrical cam tube $5c$ which is formed at an internal portion of the zoom ring 5; bridges $5d$ each of which is arranged to connect the zoom operation part $5a$ to the cam parts $5e$ in the form of tube $5c$; zoom lens moving cam projections (protruding cam strips), each of which is formed on the inner circumference surface of the cam tube $5c$; and cam followers $5f$ each of which is formed on the outer circumference surface of the cam tube $5c$. A second lens carrying frame 6 carries a power varying optical system and has parts $6a$ and $6b$ which are integrally formed. These parts include a key way $6a$ which is formed on an external portion of the second lens carrying frame 6 to extend in the direction of the optical axis, and cam followers $6b$ which have the cam projections $5e$ sandwiched between them. Reference numeral 7 denotes a diaphragm device. Reference numeral 8 denotes a first lens carrying frame which is used for both focusing and zooming. A helicoid screw $8a$ is formed integrally with the first lens carrying frame 8 and is provided for the movement for focusing. Reference numeral $8b$ denotes a gear. A straight moving tube 9 is disposed on the outer side of the cam tube $5c$ and has parts $9a$, $9b$ and $9c$ which are integrally formed. These parts include a helicoid screw $9a$ which is provided for the movement for focusing; keys $9b$ which are arranged to guide the straight moving tube 9 in the direction of the optical axis in conjunction with the guide grooves $1c$; and a cam $9c$ which is formed on the inner circumference surface of the straight moving tube 9 and is arranged to move the first lens carrying frame 8 for zooming. A first lens group L1 is carried by the first lens carrying frame 8. Reference symbol L2 denotes a second lens group. Reference symbol L3 denotes a third lens group. Reference symbol M denotes a motor which is disposed within the lens barrel. An output gear 10 coupled to the motor M engages the gear $8b$ of the first lens carrying frame 8.

With the embodiment arranged in the manner as described above, when the zoom operation part $5a$ is operated to rotate for zooming, the cam tube $5c$, which is connected by the bridges $5d$ to (is integral with) the zoom operation part $5a$, comes to rotate in its fixed position. The second lens carrying frame 6 which is fitted inside the cam tube $5c$ is movable only in the direction of the optical axis since the key 2 is fitted in the key way $6a$. Meanwhile, the cam followers $6b$ carry the cam projections $5e$ in such a way as to permit sliding without rattle. Therefore, the second lens carrying frame 6 moves in the direction of the optical axis as the cam tube 5c rotates.

Since the keys 9b are fitted in the optical-axis direction guide grooves 1c, the straight moving tube 9 is movable only in the direction of the optical axis. While the straight moving tube 9 is carried to be slidable over the outside of the cam tube 5c, the cam 9c is tightly engaging the cam followers 5f of the cam tube 5c. Therefore, when the cam tube 5c rotates, the straight moving tube 9 is moved to a given extent in the direction of the optical axis. The helicoid screw 9a formed in the straight moving tube 9 is engaging the helicoid screw 8a of the first lens carrying frame 8. Therefore, the first lens carrying frame 8 is moved in the direction of the optical axis for zooming according to the movement of the straight moving tube 9.

The first lens group L1 which is carried by the first lens carrying frame 8 serves also as a focusing lens. When the first lens carrying frame 8 is rotated either by a manual rotating operation or by the motor M used as a drive source, the first lens group L1 is movable in the direction of the optical axis through the action of the helicoid screws 8a and 9a for focus adjustment.

The key 2 which is carried by the fixed part 1 is fixed by the screw 3 through a slot 2a which extends in the direction of circumference with the optical axis 0—0' located at its center. Therefore, the position of the key 2 is finely adjustable by loosening the screw 3 and moving the key 2 in the circumferential direction (around the optical axis) and then by tightening the screw 3 to fix the key 2 at a desired position. When the key 2 is revolved around the optical axis, the second lens carrying frame 6 rotates through the key way 6a. Then, the action of the cam followers 6b engaging the cam projections 5e causes the position of the key 2 to be adjusted in the direction of the optical axis along the cam projections 5e. In ordinary zoom lenses in general, an error sometimes occurs in a focal position due to a part manufacturing error, or a flange focal distance might deviate from a correct distance as a result of adjustment of the position of the first lens group made by moving the first lens group in such a way as to make the focal position on the telephoto side coincide, with the focal position on the wide-angle side. In contrast, in accordance with the arrangement of this embodiment, a correct flange focal distance can be retained if the position of the second lens group L2 is adjusted by revolving and adjusting the mounted position of the key 2 in such a way as to vary the abutting position of the cam followers 6b on the cam projections 5e.

It has been ascertained that the number of necessary parts can be reduced to lower the manufacturing cost by the adoption of the new lens barrel arrangement according to this invention which obviates the necessity of a guide tube indispensable to the conventional lens barrel arrangement. Further, the adjustment of the flange focal distance which has heretofore necessitated the use of a special additional part can be accomplished by simply adjusting the mounted position of a guide member attached to the fixed part (the key, in the case of this specific embodiment) in accordance with this invention. Therefore, the flange focal distance is continuously adjustable to any desired degree by using the cam of the cam tube without any increase in cost. Further, the structural arrangement of the lens barrel simplified by this invention gives a vacant space, which can be used in arranging a motor, a gear or some electric circuit as necessary.

What is claimed is:

1. A lens barrel comprising:
    a) a lens for zooming; and
    b) a moving mechanism for moving said lens in the direction of an optical axis thereof, said moving mechanism including a zoom operation tube for performing a zooming operation and a cam tube disposed inside said zoom operation tube and having a cam part, said zoom operation tube and said cam tube being integrally formed.

2. A lens barrel according to claim 1, wherein said zoom operation tube and said cam tube are integrally formed through a bridge formed between them.

3. A lens barrel according to claim 1, wherein said cam part is formed integrally with said cam tube as a protruding cam strip on an inner circumference surface of said cam tube.

4. A lens barrel according to claim 2, wherein said bridge includes a plurality of bridge parts formed at their respective positions around the optical axis.

5. A lens barrel according to claim 1, wherein said moving mechanism further includes a first lens carrying member arranged to carry said zooming lens, said first lens carrying member engaging said cam part of said cam tube and being moved in the direction of the optical axis in response to a rotation of said cam tube.

6. A lens barrel according to claim 3, wherein said moving mechanism further includes a first lens carrying member arranged to carry said zooming lens, said first lens carrying member engaging said cam part of said cam tube and being moved in the direction of the optical axis in response to a rotation of said cam tube.

7. A lens barrel according to claim 3, wherein a protruding cam follower is integrally formed on an outer circumference surface of said cam tube.

8. A lens barrel according to claim 7, wherein said moving mechanism further includes a tube member arranged to move, in the direction of the optical axis, a second lens carrying member which carries a second lens for zooming, a second cam part formed on an inner circumference surface of said tube member engaging said cam follower of said cam tube to move said second lens carrying member in the direction of the optical axis in response to a rotation of said cam tube.

9. A lens barrel according to claim 8, wherein said tube member and said second lens carrying member are coupled with each other by a helicoid mechanism.

10. A lens barrel according to claim 5, wherein said first lens carrying member is arranged to be movable only in the direction of the optical axis by a key connection.

11. A lens barrel according to claim 6, wherein said first lens carrying member is arranged to be movable only in the direction of the optical axis by a key connection.

12. A lens barrel according to claim 8, wherein said tube member is arranged to be movable only in the direction of the optical axis by a key connection.

13. A lens barrel comprising:
    a) a fixed member including a mount for attaching and detaching said lens barrel to and from an optical apparatus, said fixed member further including a guide member;
    b) a first lens carrying member arranged to be movable only in the direction of an optical axis by said guide member;
    c) a cam tube having a cam part arranged on an inner circumference surface thereof to move said first lens carrying member in the direction of the optical axis; and d) an operation member arranged to rotate said cam tube.

14. A lens barrel according to claim 13, wherein said guide member is a key having its position arranged to be adjustable relative to said fixed member in a direction around the optical axis, a flange focal distance being arranged to be finely adjustable by adjusting the position of said key.

15. A lens barrel according to claim 13, wherein said cam part of said cam tube is formed as a protruding cam strip, and wherein said first lens carrying member is arranged to catch and carry said protruding cam strip to be moved in the direction of the optical axis in response to a rotation of said cam tube.

16. A lens barrel according to claim 13, wherein said cam tube and said operation member are integrally formed through a plurality of bridges formed at their respective positions.

17. A lens barrel according to claim 14, wherein said cam tube and said operation member are integrally formed through a plurality of bridges formed at their respective positions.

18. A lens barrel according to claim 15, wherein said cam tube and said operation member are integrally formed through a plurality of bridges formed at their respective positions.

19. A lens barrel according to claim 13, further comprising a second lens carrying member arranged to be moved in the direction of the optical axis in response to a rotation of said cam tube.

20. A lens barrel according to claim 19, wherein said second lens carrying member is arranged to be moved in the direction of the optical axis in response to an output rotation of a motor.

* * * * *